United States Patent [19]
Toriyama et al.

[11] Patent Number: 5,866,245
[45] Date of Patent: Feb. 2, 1999

[54] SILICON NITRIDE CERAMICS HAVING A HIGH RELIABILITY AND A METHOD FOR PRODUCTION THEREOF

[75] Inventors: Motohiro Toriyama; Kiyoshi Hirao; Manuel E. Brito; Syuzo Kanzaki; Yasuhiro Shigegaki, all of Aichi, Japan

[73] Assignees: Japan as represented by Director General of Agency of Industrial Science and Technology; Fine Ceramics Research Association, both of Tokyo, Japan

[21] Appl. No.: 773,004

[22] Filed: Dec. 23, 1996

[30] Foreign Application Priority Data

Dec. 22, 1995 [JP] Japan ................................. 7-350311

[51] Int. Cl.$^6$ ............................... B32B 18/00; C04B 35/58
[52] U.S. Cl. ...................... 428/319.3; 156/89; 264/603; 264/628; 264/638; 264/639; 264/650; 264/683; 264/173.11; 427/243; 427/397.7; 427/419.7; 428/212; 428/216; 428/312.2; 428/312.6; 428/316.6; 428/318.4; 428/318.6; 428/698; 428/697; 428/699; 428/701
[58] Field of Search ..................................... 428/212, 698, 428/216, 312.2, 312.6, 316.6, 318.4, 318.6, 697, 699, 701, 319.3; 156/89; 264/603, 628, 638, 639, 650, 683, 73.11

[56] References Cited

U.S. PATENT DOCUMENTS 4,956,137 9/1990 Dwivedi .................................. 501/153
4,993,481 2/1991 Kamimoto et al. ...................... 165/10

OTHER PUBLICATIONS

Journal of the Ceramic Society of Japan, vol. 97, No. 8, pp. 872–874, 1989, Yoshio Ukyo, et al., "High Strength $Si_3N_4$ Cermanics".

Journal of the Ceramic Society of Japan, vol. 103, No. 4, pp. 407–408, 1995, Masashi Yoshimura, et al., "Grain Size Controlled High–Strength Silicon Nitride Ceramics".

Journal of American Ceramics Society, vol. 73, No. 9, pp. 2684–2689, 1990 Lauge Nielsen, "Strength and Stiffness of Porous Materials".

Primary Examiner—Archene Turner
Attorney, Agent, or Firm—Oblon, Spivak, McClelland, Maier & Neustadt, P.C.

[57] ABSTRACT

The present invention relates to a silicon nitride sintered body having a remarkably increased strain-to-fracture, a low elasticity and high strength, characterized by consisting of a layered structure of alternating porous silicon nitride layers 1 to 1000 μm thick with a porosity of 5 to 70 volume % and dense silicon nitride layers 1 to 1000 μm thick with a porosity of less than 5 volume %, being layered as materials with optional tiers. In addition, this invention relates to a method for producing the silicon nitride sintered body as described above, which comprises of forming dense layers and porous layers by sheet casting or extrusion forming so as to prepare the layers to be capable of 1 to 1000 μm thick after sintering, stacking them to obtain layered materials with optional tiers and sintering them at 1600° to 2100 °C. under a nitrogen atmosphere.

18 Claims, 1 Drawing Sheet

DENSE SILICON NITRIDE

POROUS SILICON NITRIDE

SILICON NITRIDE CERAMICS HAVING A HIGH RELIABILITY AND A METHOD FOR PRODUCTION THEREOF

DESCRIPTION OF THE INVENTION

The present invention relates to silicon nitride ceramics having a high reliability in mechanical properties owing to a high tolerance to impact force, stress and strain, and a method for production thereof.

A silicon nitride sintered body having a high reliability according to the present invention has physical properties of low elastic modulus and high strength, and can improve the amount of strain up to fracturing remarkably, and it can be suitably employed as structural components in mechanisms requiring mechanical strength and having significant differences in thermal expansion and a elastic modulus between their components, wherein the components induce stress by strain caused therein. The final products of the present invention are suitable particularly for high-temperature structural components used for a high-temperature heat engine, and stationary components requiring strict constraint conditions.

BACKGROUND OF THE INVENTION

The improvement of strength of ceramics has been indispensable for the increase of strain-to-fracture of them. Typical prior arts developed from such a viewpoint include the following.

The strength of silicon nitride ceramics has been accomplished by preventing defect structure causing in the ceramics in the process of production, and reducing the size of particles of them. For example, as shown in "J. Ceram. Soc. Jpn., 103 [4], pp. 407–408 (1995)", a material with high strength developed by using a sintering aid for controlling grain growth and performing sintering carefully at a temperature causing no grain growth has been reported. In addition, as shown in "J. Ceram. Soc. Jpn., 97, pp. 872–874 (1989)", a silicon nitride with high strength has been obtained by using a component to be dissolved to form a solid state in silicon nitride particles during sintering as a sintering aid, and controlling sintering thereby.

However, the above methods involve the following problems, and the solution thereof has been demanded fairly.

In order to prevent defect structure causing in the ceramics in a process of production, and reduce the size of particles of them, extremely minute process control is required as shown in the above examples. For example, as shown in "Locus and Results of advanced Research and Development of Fine Ceramics, edited by Fine Ceramics Research Association, 1993", it is required with a view to improving strength of the ceramics to repeat a vast amount of experiments and analysis, for making a thorough investigation of many factors and solving them successively. Because of these situations, the increase of strain-to-fracture owing to the improvement of strength of the ceramics has caused problems of an increase in cost and a lack in reproductivity, which have restrained the materials from being used for industrial utilization.

SUMMARY OF THE INVENTION

This invention provides a novel multi-layered silicon nitride having a high reliability and a large tolerance to impact force, stress and strain, and a method for production thereof. The present invention relates to a silicon nitride sintered body having a remarkably increased strain-to-fracture, a low elasticity and high strength, characterized by consisting of a layered structure of alternating porous silicon nitride layers 1 to 1000 µm thick with a porosity of 5 to 70 volume % and dense silicon nitride layers 1 to 1000 µm thick with a porosity of less than 5 volume %, being layered as materials with optional tiers. In addition, this invention relates to a method for producing the silicon nitride sintered body as described above, which comprises of forming dense layers and porous layers by sheet casting or extrusion forming so as to prepare the layers to be capable of 1 to 1000 µm thick after sintering, stacking them to obtain layered materials with optional tiers and sintering them at 1600° to 2100° C. under a nitrogen atmosphere.

DETAILED DESCRIPTION OF THE INVENTION

Figure 1:
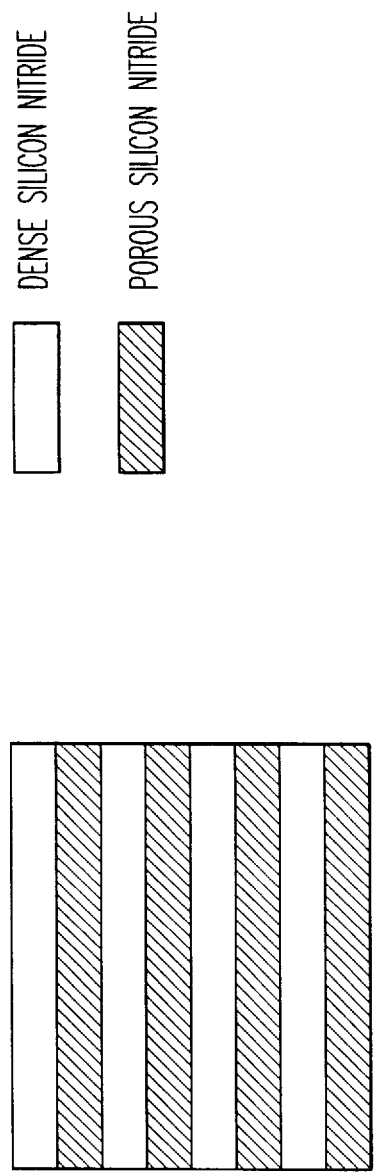
FIG. 1 shows an explanatory view showing a layered structure of alternating dense silicon nitride layers and porous silicon nitride layers with optional tiers.

Under these circumstances, taking the above prior arts into consideration, the present inventors started their studies aiming at the development of a processing of a silicon nitride with a high reliability, being capable of increasing strain-to-fracture of it by reducing its elastic modulus and maintaining its strength, without depending on the process of production. In particular, a viewpoint of increasing strain-to-fracture of it by reducing its elastic modulus is an unprecedented important point, and has a possibility of solving problems being not solved by prior arts easily.

Generally, the dispersion of pores in ceramics is effective for the reduction of a elastic modulus of them. It has been known, however, that if the pores are dispersed in ceramics three-dimensionally and homogeneously, they reduce strength of ceramics sharply. For example, in "J. Am. Ceram. Soc., 73 [9], pp. 2684–89 (1990)", it is reported that the presence of only 10% of pores in ceramics reduces strength of them by about 40%. Hence, the present inventors attempted to control the configuration and distribution of the pores by producing ceramic composites with a layered structure of alternating silicon nitride porous layers with a certain porosity and a silicon nitride dense layers. The silicon nitride dense layer itself has high strength and a high elasticity, while the porous layer has a low elastic modulus and low strength. However, the present inventors have found the layered composites with remarkably increased strain-to-fracture, a low elastic modulus and high strength can be obtained by laminating the layers to compensate for the defects of both layers, which has led to the accomplishment of the present invention.

The present inventors have found as a result of a minute examination that it is required for the expression of a low elastic modulus and high strength of ceramics to control the porosity of dense layers to less than 5 volume %, from the viewpoint of expressing high strength, and the porosity of porous layers within the range of 5 to 70 volume %, from the viewpoints of reducing a elastic modulus and maintaining shape retentivity as composites, and besides to control the thickness of each layer to obtain the layers to be capable of about 100 µm thick (preferably 1 to 1000 µm thick) after sintering.

In the case of the layered composites according to the present invention, the base station of fracture, being most important in the fracture of ceramics can be restricted to dense layers with high strength and almost being free from pores. It has been found thereby that a general multiple rule cannot be applied to strength, while it can be applied to a elastic modulus, and that the composites can maintain high strength, even by combining porous layers having low strength themselves.

It is an object of the present invention to provide a silicon nitride sintered body with a high reliability and remarkably increased strain-to-fracture, owing to a low elasticity and high strength of it.

Besides, it is another object of the present invention to provide a method for producing the silicon nitride sintered body with a high reliability and the above described properties conveniently.

The present invention solving the above subject relates to a silicon nitride sintered body having a remarkably increased strain-to-fracture, a low elasticity and high strength, characterized by consisting of a layered structure of alternating porous silicon nitride layers 1 to 1000 µm thick with a porosity of 5 to 70 volume % and dense silicon nitride layers 1 to 1000 µm thick with a porosity of less than 5 volume %, being layered as materials with optional tiers.

In addition, the present invention relates to a method for producing the silicon nitride sintered body as described above, which comprises of forming dense layers and porous layers by sheet casting or extrusion forming so as to prepare the layers to be capable of 1 to 1000 µm thick after sintering, stacking them to obtain layered materials with optional tiers and sintering them at 1600° to 2100° C. under a nitrogen atmosphere; moreover, a preferable embodiment of the present invention is a method for producing the silicon nitride sintered body as described above, wherein the sintering is performed to obtain the materials consisting of dense silicon nitride layers and porous silicon nitride layers with a final porosity of 5 to 70 volume %, by employing large particles or anisotropic particles with low sintering quality as silicon nitride raw materials.

Hereafter the present invention will be described in more detail.

The present invention relates to silicon nitride ceramics with a layered structure of alternating porous silicon nitride layers and dense silicon nitride layers with a prescribed thick respectively, and a method for producing said silicon nitride ceramics, which comprises of layering dense layers and porous layers formed by sheet forming or extrusion forming to prepare the layers with optional tiers to be capable of about 100 µm (1–1000 µm) thick after sintering, and sintering them under a nitrogen atmosphere to obtain a silicon nitride sintered body.

As a silicon nitride material for dense layers may be employed alpha-type and beta-type crystal materials; it is desirable to employ a fine powder with an average particle diameter of less than 1 µm, since it is needed to prepare the material to be fully densified during sintering with porous layers. As a sintering aid for densification can be employed those generally used such as $Al_2O_3$, MgO, CaO, $Y_2O_3$, $Yb_2O_3$, $HfO_2$, $Sc_2O_3$, $CeO_2$, $ZrO_2$ and $SiO_2$. The combination of these sintering aids and the amount thereof to be added vary according to a method of sintering (gas-pressure sintering, hot pressing, hot isostatic pressing, etc.); it is preferable to adjust the amount thereof to the smallest required for the densification to prevent a sintering aid diffusing into the porous layers during sintering.

In milling these materials for the dense layers, an ordinary machine employed for milling or kneading a powder can be used. The milling may be performed according to a wet method or a dry method; preferably it is performed according to a wet method. In wet milling, solvents such as water, methanol, ethanol and toluene are used, and an organic solvent is preferably used with a view to controlling the oxidation of a silicon nitride. When an organic solvent is used, milling can be performed more effectively by employing a dispersing agent such as cationic cellulose.

On the other hand, as a material for porous layers, it is necessary to employ, for example, large particles, anisotropic particles and the like, so as to prepare the porous layers with 5 to 70 volume % of pores to be remained during sintering with dense silicon nitride layers. As particles may be employed alpha-type and beta-type crystal particles; it is desirable to employ large particles with an average particle diameter of more than 5 µm, anisotropic particles with a short diameter of more than 1 µm and a powder with an aspect ratio of more than 5, so as to prepare the porous layers with a prescribed porosity remained. Besides, according to a material to be employed and a porosity to be remained, sintering aids employed for dense layers and silicon nitride fine powders of less than 1 µm may be added to the materials properly. The combination of sintering aids and fine powders and the amount thereof to be added vary according to a method of sintering (gas-pressure sintering, hot pressing, hot isostatic pressing, etc.); it is preferable to adjust the amount thereof to the smallest required for obtaining layers with a prescribed porosity to prevent a sintering aid diffusing into dense layers during sintering.

These materials for porous layers are milled in the same manner as in the case of dense layers; however, a method of milling using ultrasound dispersion or a resin pot and a resin coat ball is preferably employed with a view to prevent large particles and anisotropic particles from breaking.

Next, the thus prepared mixed slurries for dense layers and porous layers are mixed with a proper amount of a binder such as polyvinyl butyral, polyvinyl alcohol and an acrylic resin, and formed by sheet forming according to the doctor blade method or extrusion forming to prepare the sheets to be capable of 1 to 1000 µm thick after sintering. These sheets are layered to obtain the formed body having the layers with optional tiers (e.g., ABABAB, AABBAA, ABBABB, (a dense layer expressed as A, a porous layer expressed as B)). The tiers of the layers is determined by the porosity of the porous layers and the thick of each layer, depending on a elastic modulus and strength to be expressed. As a method of layering, for example, in the case of employing a thermoplastic binder, heat pressure laminating is performed; the optimum method is selected according to the physical properties of a binder to be contained.

The above formed body is calcined at about 400° to 600° C. to remove a binder. The optimum temperature is selected according to the kind of a binder. The formed body is further treated by CIP (cold hydrostatic pressing) according to the kind thereof with a view to controlling the residual porosity of the sintered body. Calcination and a CIP treatment may be also performed inversely; in consideration of shape retentivity during sintering, particularly in the case of a formed body with a high porosity, it is preferable to perform a CIP treatment before calcination, and further to perform a CIP treatment after the calcination.

Next, the formed body is sintered under a nitrogen atmosphere, preferably at 1600° to 2100° C. As a method of sintering, ordinary methods for sintering of silicon nitride, such as normal-pressure sintering, gas-pressure sintering, hot pressing and HIP are employed. Sintering temperature is determined to a preferable level being capable of obtaining the layered material having dense layers fully densified to a porosity of less than 5 volume % and porous layers with a prescribed porosity remained. It is also necessary that as a nitrogen atmosphere is applied a nitrogen pressure preventing silicon nitride from decomposing at a determined temperature.

The present invention relates a structure of a silicon nitride consisting of a layered structure of alternating dense and porous silicon nitride layers shown in FIG. 1, being layered as a laminate with optional tiers, and a method for production thereof, and the method for production thereof, which comprises of layering dense layers and porous layers of 1 to 1000 μm thick formed by sheet forming or extrusion forming to obtain a layered laminate with optional tiers, and sintering them under a nitrogen atmosphere.

Silicon nitride ceramics produced according to the method of the present invention have a large tolerance to strain caused by stress, since the elastic modulus thereof decreases by 30 to 50%, though the strength thereof does not decrease as compared with dense silicon nitride ceramics. It has been found, hence, that such silicon nitride ceramics can be utilized as structural components to be worked by impact force, and besides have a high reliability, being capable of machining.

EXAMPLES

Hereafter the present invention will be described specifically according to Examples; however, the present invention is restricted to said Examples by no means.

Example 1

(1) Preparation of Dense Layers

To an alpha-type silicon nitride powder (oxygen content: 1.26 weight %, alpha-phase: more than 95 weight %) were added 5 weight % of yttrium oxide and 2 weight % of aluminum oxide as sintering aids, and to the mixture was added a mixed solvent of toluene/butanol (4/1), a dispersing agent and a binder to obtain a slurry. The green sheets for dense layers 100 μm thick were produced from the slurry by tape casting.

(2) Preparation of Porous Layers

Separately, the sheets for porous layers 50 μm thick were produced by tape casting from a material containing 0 to 70 volume % of beta-type silicon nitride whiskers (short diameter: 1 μm, aspect ratio: 30) and an alpha-type silicon nitride powder as the rest (oxygen content: 1.26 weight %, alpha-phase: more than 95 weight %) in the same manner as described above. The whisker contents are shown in Table 1 as a to d.

(3) Preparation and Sintering of a Laminate

Fifty-five dense layers and 55 porous layers were layered alternately and stacked to prepare a laminate. The formed body was treated by CIP, calcined to burn out the organic compounds and sintered at 1850° C. for 6 hours under a nitrogen pressure of 10 atmospheres. According to the present Example, a multi-layered silicon nitride consisting of alternating dense layers free from pores and porous layers containing about 30 volume % of pores was obtained.

(4) Physical Properties of the Laminate

For comparison, 100 tapes for dense layers were layered to prepare a dense silicon nitride under the same conditions as described above. The physical properties of the laminates according to the present invention are shown in Table 1 together with those of Comparative Example. As is apparent from the description of Table 1, the laminates according to the method of the present invention maintain high strength, though the elastic modulus thereof decrease as compared with that of the dense silicon nitride of Comparative Example, and it has been found consequently that the amount of strain up to fracture can be improved remarkably.

TABLE 1

|   | Whisker contents (vol %) | Density of laminate (g/cm³) | Porosity of porous layer (vol %) | Elastic modulus (GPa) | Bending strength (MPa) | Strain-to-fracture (×10⁻³) |
|---|---|---|---|---|---|---|
| a | 0 | 3.204 | 0.1 | 318 | 1038 | 3.27 |
| b | 30 | 2.849 | 27.3 | 252 | 804 | 3.20 |
| c | 50 | 2.820 | 32.4 | 215 | 792 | 3.70 |
| d | 70 | 2.816 | 32.9 | 238 | 926 | 3.90 |
| Comp. Ex. | — | 3.245 | 0.1 | 330 | 1051 | 3.18 |

Example 2

(1) Preparation of Dense Layers

Sheets 100 μm thick for dense layers were prepared in the same manner as in Example 1.

(2) Preparation of Porous Layers

To the beta-type silicon nitride whiskers of Example 1 and an alpha-type silicon nitride powder as materials for porous layers were added 5 weight % of yttrium oxide and 2 weight % of aluminum oxide as sintering aids, and sheets 50 μm thick for porous layers were produced in the same manner as in Example 1.

(3) Preparation and Sintering of a Laminate

Hereupon, a dense layer mentioned as A and a porous layer mentioned as B, the layers were layered to prepare obtain layered material with tiers of ABABAB (Type I) and tiers of ABBABB (Type II), and stacked to prepare laminated compacts. The laminates were treated by CIP, calcined to remove the organic compounds and sintered in the same manner as in Example 1. According to the present Example, laminates consisting of alternating dense layers free from pores and porous layers with about 20 volume % of pores were obtained.

(4) Physical Properties of the Laminates

The physical properties of the laminates according to the present invention are shown in Table 2 together with those of Comparative Example. As is apparent from the physical properties described in Table 2, it has been found that the laminates according to the present invention can maintain high strength, by layering dense layers and porous layers to obtain the layered materials with optional tiers, though the porosity of the porous layers of the laminates is almost the same as these of the original porous layers, and that consequently strain-to-fracture of the laminates can be improved remarkably.

TABLE 2

|   | Tiers of layers | Density of laminate (g/cm³) | Porosity of porous layer (vol %) | Elastic modulus (GPa) | Bending strength (MPa) | Strain-to-fracture (×10⁻³) |
|---|---|---|---|---|---|---|
| I | ABABAB | 3.053 | 18.9 | 284 | 1116 | 3.93 |
| II | ABBABB | 2.923 | 20.9 | 261 | 1105 | 4.23 |
| Comp. Ex. | — | 3.245 | 0.1 | 330 | 1051 | 3.18 |

As described above in detail, the present invention relates to a silicon nitride sintered body having a remarkably increased strain-to-fracture, a low elasticity and high strength, characterized by consisting of a layered structure of alternating porous silicon nitride layers 1 to 1000 μm thick with a porosity of 5 to 70 volume % and dense silicon nitride layers 1 to 1000 μm thick with a porosity of less than 5 volume %, being layered as materials with optional tiers, and silicon nitride ceramics obtained according to the present invention have a high reliability, a large tolerance to strain and stress, since the strain-to-fracture thereof increases remarkably owing to the decrease of the elastic modulus thereof, though the strength thereof does not decrease as compared with ordinary dense silicon nitride ceramics. Hence, silicon nitride ceramics according to the present invention can be employed easily in mechanisms requiring mechanical strength and having significant differences in thermal expansion and a elastic modulus between their components.

Moreover, according to the present invention, silicon nitride ceramics having a high reliability and physical properties of a low elastic modulus and high strength described above can be produced conveniently.

What is claimed is:

1. A silicon nitride sintered body, consisting essentially of:
    a plurality of silicon nitride dense layers (A) 1–1,000 μm thick having a porosity of less than 5 volume %, and
    a plurality of silicon nitride porous layers (B) 1–1,000 μm thick having a porosity of 5 to 70 volume %,
    wherein said silicon nitride layers (A) and (B) are alternately layered.

2. The silicon nitride sintered body of claim 1, wherein said layers are layered with tiers.

3. The silicon nitride sintered body of claim 1, further consisting essentially of at least one sintering aid selected from a group consisting of $Al_2O_3$, $MgO$, $CaO$, $Y_2O_3$, $Yb_2O_3$, $HfO_2$, $Sc_2O_3$, $CeO_2$, $ZrO_2$ and $SiO_2$.

4. The silicon nitride sintered body of claim 1, comprising said layers in the pattern ABABAB.

5. The silicon nitride sintered body of claim 1, comprising said layers in the pattern ABBABB.

6. The silicon nitride sintered body of claim 1, wherein said sintered body has an elastic modulus of 215 to 284 GPa.

7. The silicon nitride sintered body of claim 6, wherein said sintered body has a bending strength of 792 to 1116 MPa.

8. The silicon nitride sintered body of claim 1, wherein said sintered body has a bending strength of 792 to 1116 MPa.

9. A method for producing the silicon nitride sintered body as claimed in claim 4, which comprises of forming dense layers and porous layers by sheet casting or extrusion forming so as to prepare the layers to be capable of 1 to 1000 μm thick after sintering, stacking them to obtain layered materials with optional tiers and sintering them at 1600° to 2100° C. under a nitrogen atmosphere.

10. A method for producing the silicon nitride sintered body as claimed in claim 9, wherein the sintering is performed to obtain the materials consisting of dense silicon nitride layers and porous silicon nitride layers with a final porosity of 5 to 70 volume %, by employing large particles or anisotropic particles with low sintering quality as silicon nitride raw materials.

11. A method for producing the silicon nitride sintered body of claim 1, comprising:
    alternately layering a plurality of first layers and second layers, to form a body; and sintering said body at 1600° to 2100° C.

12. The method of claim 11, wherein said first layers comprises silicon nitride particles having an average diameter of less than 1 μm.

13. The method of claim 11, wherein said first layers, said second layers, or said first layers and said second layers, comprise at least one sintering aid selected from the group consisting of $Al_2O_3$, $MgO$, $CaO$, $Y_2O_3$, $Yb_2O_3$, $HfO_2$, $Sc_2O_3$, $CeO_2$, $ZrO_2$ and $SiO_2$.

14. The method of claim 11, wherein said sintering is carried out by gas-pressure sintering, hot pressing or hot isostatic pressing.

15. The method of claim 11, wherein said second layers comprise silicon nitride selected from the group consisting of particles having an average particle diameter of more than 5 μm, anisotropic particles with a short diameter of more than 1 μm and a powder with an aspect ratio of more than 5.

16. The method of claim 11, wherein said first layers and said second layers comprise a binder.

17. The method of claim 16, further comprising the step of calcining said body at 400° to 600° C. to remove said binder.

18. The method of claim 17, further comprising treating said body by CIP.

* * * * *